(12) United States Patent
Kruglick

(10) Patent No.: US 8,769,967 B2
(45) Date of Patent: Jul. 8, 2014

(54) ELECTROCALORIC HEAT TRANSFER

(75) Inventor: Ezekiel Kruglick, Poway, CA (US)

(73) Assignee: Empire Technology Development LLC, Wilmington, DE (US)

(*) Notice: Subject to any disclaimer, the term of this patent is extended or adjusted under 35 U.S.C. 154(b) by 639 days.

(21) Appl. No.: 12/999,182

(22) PCT Filed: Sep. 3, 2010

(86) PCT No.: PCT/US2010/047887
§ 371 (c)(1),
(2), (4) Date: Dec. 15, 2010

(87) PCT Pub. No.: WO2012/030351
PCT Pub. Date: Mar. 8, 2012

(65) Prior Publication Data
US 2012/0055174 A1 Mar. 8, 2012

(51) Int. Cl.
F25B 21/00 (2006.01)
H01F 1/12 (2006.01)

(52) U.S. Cl.
CPC ............... *F25B 21/00* (2013.01); *Y02B 30/66* (2013.01); *F25B 2321/001* (2013.01)
USPC .......................................................... 62/3.3

(58) Field of Classification Search
CPC ........... Y02B 30/66; H01F 1/15; H01F 1/017; H01F 1/12
USPC .......................................................... 62/3.1
See application file for complete search history.

(56) References Cited

U.S. PATENT DOCUMENTS

| | | |
|---|---|---|
| 2,978,875 A | 4/1961 | Lackey et al. |
| 4,673,030 A | 6/1987 | Basiulis |
| 4,757,688 A | 7/1988 | Basiulis et al. |
| 5,229,566 A | 7/1993 | Alexandres |
| 5,515,238 A | 5/1996 | Fritz et al. |
| 6,556,752 B2 | 4/2003 | Fang et al. |
| 6,588,215 B1 | 7/2003 | Ghoshal |
| 6,711,904 B1 | 3/2004 | Law et al. |
| 6,877,325 B1 | 4/2005 | Lawless |
| 7,293,416 B2 | 11/2007 | Ghoshal |
| 7,305,839 B2 | 12/2007 | Weaver, Jr. |
| 7,421,845 B2 | 9/2008 | Bell |

(Continued)

FOREIGN PATENT DOCUMENTS

| | | |
|---|---|---|
| GB | 2420662 A | 5/2006 |
| JP | H11177151 A | 7/1999 |
| WO | 2006056809 A1 | 6/2006 |
| WO | 2009126344 A2 | 10/2009 |

OTHER PUBLICATIONS

McNeil, D.A., "Pressure Drop and Heat Transfer Distributions Around a Bundle of Plasma-Treated Tubes Condensing Dropwise," Department of Mechanical and Chemical Engineering, Heriot-Watt University, Dec. 1999.

(Continued)

*Primary Examiner* — Ljiljana Ciric
*Assistant Examiner* — Alexis Cox
(74) *Attorney, Agent, or Firm* — Hope Baldauff, LLC

(57) ABSTRACT

A heat pump, including first and second chambers enclosing phase change material, each chamber having an evaporator end with hydrophilic material and a condenser end with a hybrid hydrophobic/hydrophilic material. Each chamber is also operably connected to a respective electrocaloric element.

20 Claims, 7 Drawing Sheets

(56) References Cited

U.S. PATENT DOCUMENTS

| | | | |
|---|---|---|---|
| 7,475,551 | B2 | 1/2009 | Ghoshal |
| 7,900,450 | B2 | 3/2011 | Gurin |
| 2005/0045702 | A1 | 3/2005 | Freeman et al. |
| 2005/0086948 | A1 | 4/2005 | Milke-Rojo et al. |
| 2005/0269065 | A1* | 12/2005 | Chen ............... 165/104.26 |
| 2006/0137359 | A1 | 6/2006 | Ghoshal |
| 2006/0139116 | A1 | 6/2006 | Niki et al. |
| 2006/0201161 | A1 | 9/2006 | Hirai et al. |
| 2008/0303375 | A1* | 12/2008 | Carver ..................... 310/306 |
| 2009/0293499 | A1 | 12/2009 | Bell et al. |
| 2009/0301541 | A1 | 12/2009 | Watts |
| 2009/0308081 | A1 | 12/2009 | Ouyang et al. |
| 2010/0037624 | A1 | 2/2010 | Epstein et al. |
| 2010/0096113 | A1* | 4/2010 | Varanasi et al. ............ 165/133 |
| 2010/0140772 | A1 | 6/2010 | Lin et al. |
| 2010/0175392 | A1 | 7/2010 | Malloy et al. |
| 2010/0212327 | A1* | 8/2010 | Barve et al. .................. 62/3.1 |
| 2011/0146308 | A1 | 6/2011 | Casasanta |
| 2011/0203839 | A1* | 8/2011 | Iwamoto ..................... 174/260 |
| 2011/0309463 | A1 | 12/2011 | Kruglick |
| 2012/0267090 | A1 | 10/2012 | Kruglick |

OTHER PUBLICATIONS

Kruglick, Ezekiel, U.S. Appl. No. 13/386,736, filed Jan. 24, 2012.
Kruglick, Ezekiel, U.S. Appl. No. 13/384,859, filed Jan. 19, 2012.
International Search Report and Written Opinion for PCT/US2010/047887 issued on Nov. 12, 2010.
Arik, Mehmet, Enhancement of Pool Boiling Critical Heat Flux in Dielectric Liquids, Doctoral Dissertation submitted to the University of Minnesota, Feb. 2001, USA.
Salam, et al., Pressure drop measurements in a low pressure steam condenser with a horizontal bundle of staggered tubes, Applied Thermal Engineering, 2004, pp. 1365-1379, vol. 24, Elsevier, Amsterdam, Sweden.
Arik, et al., Enhancement of pool boiling critical heat flux in dielectric liquids by microporous coatings, International Journal of Heat and Mass Transfer, 2007, pp. 997-1009, vol. 50, Elsevier, Amsterdam, Sweden.
Neese, et al., Large Electrocaloric Effect in Ferroelectric Polymers Near Room Temperature, Science, Aug. 2008, pp. 821-823, vol. 321, No. 5890, www.sciencemag.org, USA.
"Heat Diode Paves the Way for Thermal Computing," Technology Review, accessed at [http://www.technologyreview.com/blog/arxiv/24222/?a=f] Oct. 2009.
Ashley, S., "Cool Polymers: Toward the Microwave Oven Version of the Refrigerator," Scientific American Magazine, Apr. 7, 2009 accessed at http://www.sciam.com/article.cfm?id=cool-polymers&print=true Oct. 30, 2008, pp. 2.
International Search Report for International Application No. PCT/US2010/039200 mailed on Aug. 11, 2010.
Kobayashi, W. et al., "An Oxide Thermal Rectifier," Applied Physics Letters, vol. 95, 2009, pp. 3.
Li, B., et al., "Interface Thermal Resistance between Dissimilar Anharmonic Lattices," Phys. Rev. Lett., vol. 95, Issue: 10, 2005, pp. 4.
Mischenko, a. et al., "Giant Electrocaloric Effect in Thin-Film PbZr0.95Ti0.05O3," Science, vol. 311, Issue: 5765, Mar. 3, 2006, pp. 1270-1271.
Neese, B. et al., "Large Electrocaloric Effect in Ferroelectric Polymers Near Room Temperature," Science vol. 321, Issue: 5890, Aug. 8, 2008, pp. 821-823.
Peyrard, M., "The design of a thermal rectifier," Europhys. Lett. vol. 76, Issue: 1, 2006, pp. 49-55.
Seim, H. et al., "Growth of LaCoO3 thin films from β diketonate precursors," Applied Surface Science vol. 112, Mar. 1997, pp. 243-250.
Takeshi M., et al., "Ferroelectric properties of an epitaxial lead zirconate titanate thin film deposited by a hydrothermal method below the Curie temperature," Applied Physics Letters, vol. 84, Issue: 25, Jun. 21, 2004, pp. 5094-5096.
Terraneo, M. "Controlling the Energy Flow in Nonlinear Lattices: A Model for a Thermal Rectifier," Phys. Rev. Lett. vol. 88, Issue: 9, 2002, pp. 4.
Waller, D. et al., "The effect of pulse duration and oxygen partial pressure on La0.7Sr0.3CoO3.0 and La0.7Sr0.3CoO.2Fe0.8O3.5, films prepared by laser ablation," Solid State Ionics vol. 134 2000, pp. 119-125.
U.S. Office Action dated Mar. 16, 2012 in U.S. Appl. No. 12/999,684.
U.S. Office Action dated Aug. 2, 2012 in U.S. Appl. No. 12/999,684.
International Search Report for International Application No. PCT/US2011/033220 mailed on Jun. 4, 2011.
International Search Report for International Application No. PCT/US2011/052569 mailed on Dec. 20, 2011.
International Search Report for International Application No. PCT/US2011/052577 mailed on Dec. 21, 2011.
Akcay, G. et al., "Influence of mechanical boundary conditions on the electrocaloric properties of ferroelectric thin films,"Journal of Applied Physics 103 (2008).
Dames, C., "Solid-State Thermal Rectification with Existing Bulk Materials," Journal of Heat Transfer 131, No. 6 (2009).
Epstein, R.I., "Photonic and Electronic Cooling," International Conference on Emerging Trends in Electronic and Photonic Devices & Systems, ELECTRO '09, Dec. 2009.
Fett, T. et al., "Nonsymmetry in the Deformation Behaviour of PZT," Journal of Materials Science Letters 17, No. 4, (1998) (Abstract only).
Morita et al., "Ferroelectric Properties of an Epitaxial Lead Zirconate Titanate Thin Film Deposited by a Hydrothermal Method Below the Curie Temperature"; Applied Physics Letters, vol. 84, No. 25, Jun. 21, 2004.
International Search Report & Written Opinion dated Oct. 15, 2012 in PCT Application No. PCT/US12/47013.
Vereshchagina, Elizaveta, "Investigation of Solid-State Cooler Based on Electrocaloric Effect," MS Thesis, 2007.
Sebald, G. et al., "Pyroelectric Energy Conversion: Optimization Principles," IEEE Transactions on Ultrasonics, Ferroelectrics, and Frequency Control, vol. 55, No. 3, Mar. 2008.
Surana, R.. "High Strain Functionally Graded Barium Titanate and its Mathematical Characterization," A dissertation submitted to the Division of Research and Advanced Studies of the University of Cincinnati, Sep. 27, 2004. pp. 1-104.
Lankford, K., "Spacecraft Thermal Control Handbook," Chapter 10, Heat Switches, 2002, pp. 353-371.
Sharpe, W,N. Jr. and Sharpe, W. I. "Springer Handbook of Experimental Solid Mechanics," Atomic Force Microscopy in Solid Mechanics, Part B, Chapter 17.2.5 PZT Actuator Nonlinearities, Dec. 4, 2008, pp. 420-423 (http://tiny.url.com/2bg6zkt).
U.S. Official Action dated Nov. 21, 2013 in U.S. Appl. No. 13/145,948.
U.S. Official Action dated Sep. 12, 2013 in U.S. Appl. No. 13/386,736.
U.S. Official Action dated Nov. 7, 2013 in U.S. Appl. No. 13/384,859.
U.S. Notice of Allowance dated Jan. 27, 2014 in U.S. Appl. No. 13/386,736.

\* cited by examiner

ELECTROCALORIC HEAT TRANSFER

BACKGROUND

The present disclosure is generally related to transferring heat from a heat source to a heat destination and, more particularly, to transferring heat using electrocaloric element(s) in conjunction with phase change materials enclosed in boil-condensate chamber(s).

SUMMARY OF THE DISCLOSURE

The present disclosure generally relates to transferring heat, and, more particularly, to transferring heat using electrocaloric element(s) in conjunction with phase change materials enclosed in boil-condensate chamber(s).

A first aspect of the present disclosure generally describes a heat pump for transferring heat from a heat source to a heat destination. A heat pump may include a first electrocaloric element adapted to receive heat from the heat source, and a first chamber. The first chamber may include a first evaporator on a first evaporator end and a first condenser on a first condenser end. The first evaporator may be operably coupled to the first electrocaloric element. The heat pump may also include a first phase change material enclosed in the first chamber. The first phase change material may be adapted to be in a liquid state and/or a vapor state, and may be adapted to flow from the first evaporator to the first condenser when in a vapor state and to flow from the first condenser to the first evaporator when in the liquid state. The heat pump may also include a second electrocaloric element operably coupled to the first condenser, and a second chamber. The second chamber may include a second evaporator on a second evaporator end and a second condenser on a second condenser end. The second evaporator may be operably coupled to the second electrocaloric element and the second condenser end may be adapted to transfer heat to the heat destination. The heat pump may also include a second phase change material enclosed in the second chamber. The second phase change material may be adapted to be in a liquid state and/or a vapor state, and may be adapted to flow from the second evaporator to the second condenser when in the vapor state and to flow from the second condenser to the second evaporator when in the liquid state.

In some examples of the first aspect, the heat pump may also include a first and second voltage source. The first voltage source may be operably coupled to the first electrocaloric element, and may be adapted to apply a first voltage to the first electrocaloric element. The first voltage may cause the first electrocaloric element to transfer heat from the heat source to the first chamber. The second voltage source may be operably coupled to the second electrocaloric element, and may be adapted to apply a second voltage to the second electrocaloric element. The second voltage may cause the second electrocaloric element to transfer heat from the first chamber to the second chamber. In some examples, the first voltage may be applied to the first electrocaloric element at a first time period and the second voltage may be applied to the second electrocaloric element at a second time period. In some examples, the first time period and the second time period may be non-overlapping time periods.

In some examples of the first aspect, the first phase change material may comprise water, where the liquid state may comprise liquid water and the vapor state may comprise water vapor. In some examples of the first aspect, the second phase change material may comprise water, where the liquid state may comprise liquid water and the vapor state may comprise water vapor.

In some examples of the first aspect, the first evaporator may be comprised of a sintered material, a hydrophilic material and/or a superhydrophilic material. In some examples of the first aspect, the second evaporator may be comprised of a sintered material, a hydrophilic material and/or a superhydrophilic material.

In some examples of the first aspect, the first electrocaloric element may comprise a first electrocaloric film. In some examples, the first electrocaloric film is comprised of lead zirconate titanate, lead-scandium, barium titanate, a polymer, a pyroelectric material, a ferroelectric material, and/or a antiferroelectric material.

In some examples of the first aspect, the second electrocaloric element may comprise a second electrocaloric film. In some examples, the second electrocaloric film is comprised of lead zirconate titanate, lead-scandium, barium titanate, a polymer, a pyroelectric material, a ferroelectric material, and/or a antiferroelectric material.

A second aspect of the present disclosure generally describes a heat pump for transferring heat from a heat source to a heat destination. A heat pump may include an electrocaloric element adapted to receive heat from the heat source. The heat pump may also include a chamber having an evaporator on a first end and a condenser on a second end. The evaporator may be operably coupled to the electrocaloric element. The second end may be adapted to transfer heat to the heat destination. The heat pump may also include a phase change material enclosed in the chamber. The phase change material may be adapted to be in a liquid state and/or a vapor state, and may be adapted to flow from the evaporator to the condenser when in the vapor state and to flow from the condenser to the evaporator when in the liquid state.

In some examples of the second aspect, the heat pump may also include a voltage source operably coupled to the electrocaloric element. The voltage source may be adapted to apply a voltage to the electrocaloric element to cause the electrocaloric element to transfer heat from the heat source to the first chamber.

A third aspect of the present disclosure generally describes methods of transferring heat from a heat source to a heat destination via a first heat pump and a second heat pump serially coupled. The first heat pump may include a first electrocaloric element operably coupled to a first chamber at least partially containing a first phase change material and having a first evaporator and a first condenser. The second heat pump may include a second electrocaloric element operably coupled to a second chamber at least partially containing a second phase change material and having a second evaporator and a second condenser. Such methods may include applying (for a first time period) a first voltage to the second electrocaloric element and reducing a second voltage from the first electrocaloric element. Such methods may also include applying (for a second time period) the second voltage to the first electrocaloric element and reducing the first voltage from the second electrocaloric element.

In some examples of the third aspect, the first time period and the second time period may comprise non-overlapping time periods.

In some examples of the third aspect, applying the first voltage to the second electrocaloric element and reducing a second voltage from the first electrocaloric element may cause the second evaporator to operate in a nucleate boiling state. In some examples, heat may be transferred from the first heat pump to the second heat pump when the second evaporator operates in the nucleate boiling state.

In some examples of the third aspect, applying the second voltage to the first electrocaloric element and reducing the first voltage from the second electrocaloric element may cause the first evaporator to operate in a nucleate boiling state. In some examples, heat may be transferred from the heat source to the first chamber when the first evaporator operates in the nucleate boiling state.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

Figure 1:
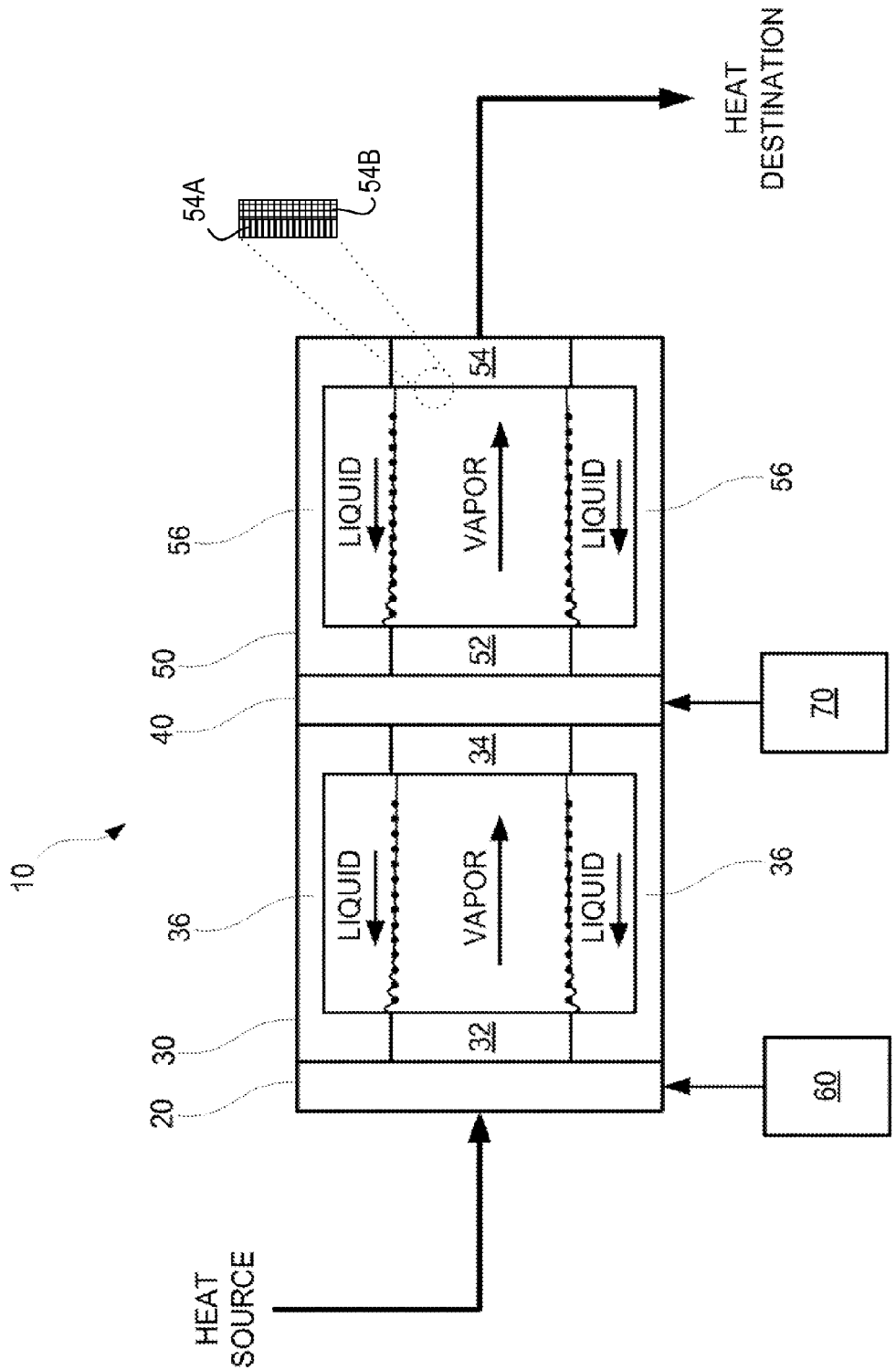
FIG. 1 is a cross-section view illustrating some example systems for transferring heat from a heat source.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

This disclosure is drawn, inter alia, to systems, methods, devices, and/or apparatus related to transferring heat from a heat source to a heat destination, and, for transferring heat by utilizing one or more electrocaloric heat pumps.

The present disclosure contemplates that many existing electrocaloric heat pumps utilize some variation of mechanical thermal switching to effectuate heat transfer. Some existing electrocaloric heat pumps connect electrocaloric material to a heat sink when the electrocaloric material is at its highest temperature, then disconnect the electrocaloric material from heat sink when the electrocaloric material cools. Such methods may effectively force the electrocaloric material to draw heat from a desired element.

An electrocaloric heat pump may be provided that may eliminate mechanical switching by utilizing a phase change material to act as a thermal switch. In some examples, systems may be designed such that, during a phase when heat is to be blocked along a return path, the sealed boil-condensate pipe (sometimes called a "heat pipe) may not allow nucleate boiling in that direction, effectively reducing thermal conductivity. In this manner, example heat pumps may essentially act as a thermal diode.

Figure 4:
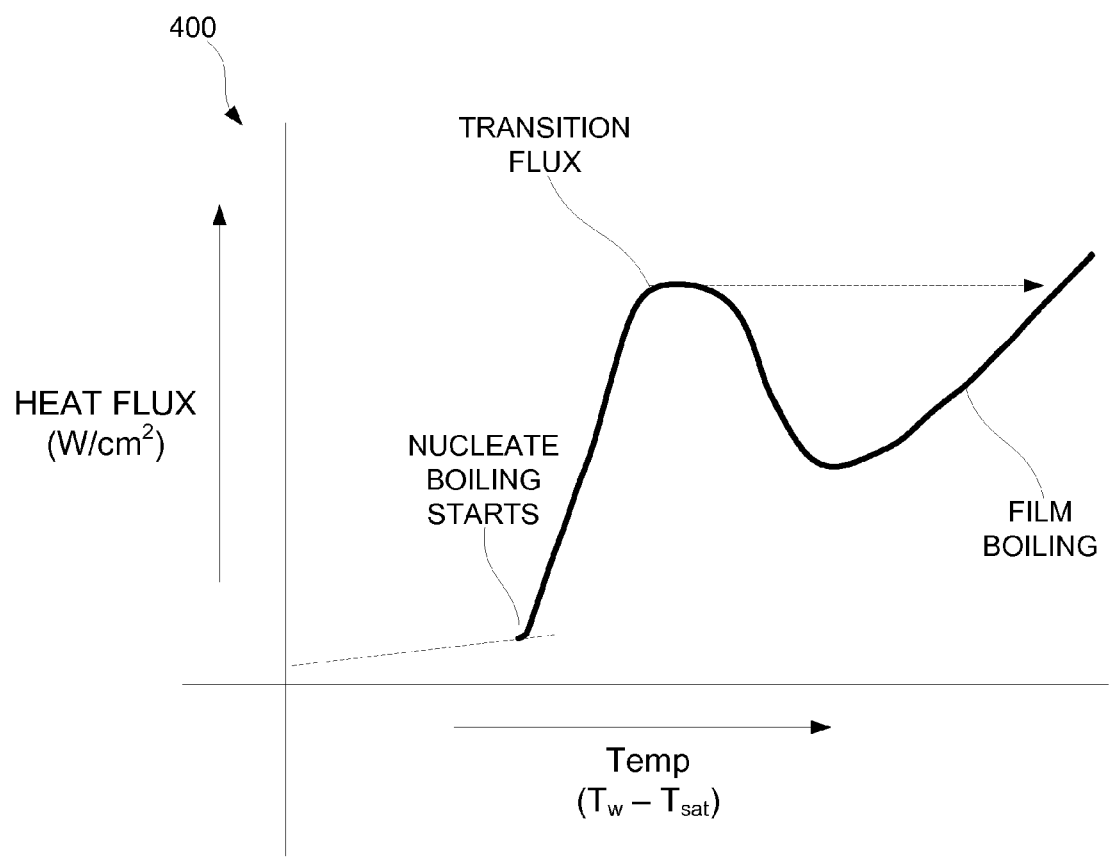
FIG. 4 is a graphical representation of general heat pipe behavior.
Figure 5:
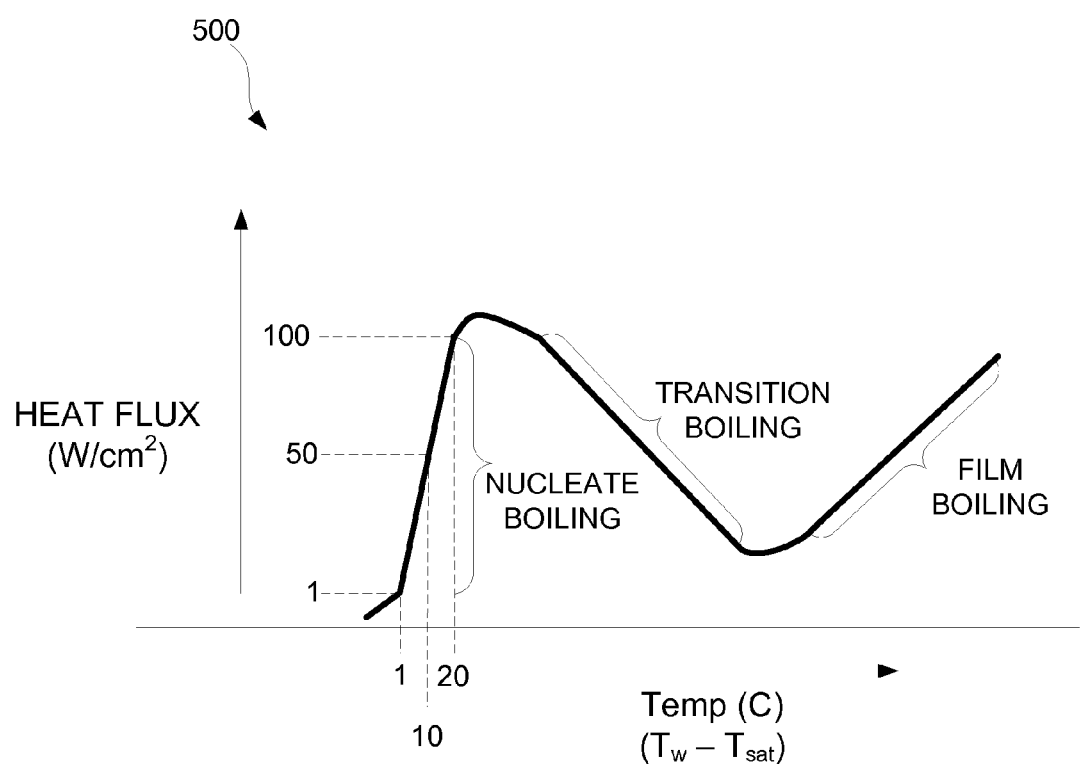
FIG. 5 is a graphical representation of an example water-based heat pipe behavior.

The present disclosure further contemplates that heat conduction in a heat pipe may follow a complex relationship between heat flux (Q) and temperature (T) as the environment within the heat pipe changes. At first, the heat pipe may provide a convection-mediated and conduction-mediated transfer (having a very low thermal flux). When a certain critical temperature is reached, boiling may begin at the heat pipe's evaporator end and the contribution of the heat of transition may lead to a dramatic increase in thermal performance. This may be referred to as the nucleate boiling region and may be a desired design operation region for many heat pipes. At a certain temperature, the boiling may begin to interfere with itself. This may be known as transition flux. In transition flux, a dramatic increase in temperature may be required to increase the heat flux. This may be referred to as film boiling. FIGS. 4 and 5 depict graphs of these regions generally (FIG. 4) and these regions for a water-based heat pipe example (FIG. 5).

FIG. 1 is a cross-section view diagram illustrating some example systems for transferring heat from a heat source, arranged in accordance with at least some embodiments of the present disclosure. In some examples, a heat pump 10 may comprise electrocaloric elements 20, 40 and heat pipes (or chambers) 30, 50. The heat pump 10 may be operably coupled (directly or indirectly) to a heat source to transfer heat away from the heat source. In some examples, the heat pump 10 may transfer heat to a heat destination.

Electrocaloric element 20 may be operably coupled to the heat source to receive heat from it. Electrocaloric element 20 may also be operably coupled to chamber 30 at the evaporator 32 end of chamber 30. In some examples, electrocaloric element 20 may be indirectly coupled to chamber 30. In some examples, a metallization electrode (e.g., aluminum) may be located at one or both ends of electrocaloric element 20. In some examples, an insulator may be utilized to prevent shorting across the heat pipe.

Chamber 30 may comprise walls 36 to enclose a phase change material. Chamber 30 may also comprise an evaporator 32 and condenser 34. Chamber 30 may be configured such that the phase change material may flow from the evaporator 32 to the condenser 34 when the phase change material is a vapor. Conversely, chamber 30 may be configured such that the phase change material may flow from the condenser 34 to the evaporator 32 when the phase change material is a liquid. In some examples, the phase change material may comprise water, which may operate in a liquid state and/or a vapor state. However, other phase change materials (e.g., methanol, ethanol, acetone, sodium and/or mercury) may be utilized. In some examples, phase change materials may be chosen based, at least in part, on target temperature range(s) and/or environmental concerns. For example, satellite heat pipes may utilize mercury, as disposal of mercury in space may be less of a concern than disposal of mercury on Earth. In some examples, sodium may be used for relatively high temperature implementations, while methanol may be used for relatively low temperature implementations Chamber 30 may be operably coupled to electrocaloric element 40. This may occur at the condenser 34 end of chamber 30. Electrocaloric element 40 may also be operably coupled to the evaporator 52 end of chamber 50.

Similar to chamber 30, chamber 50 may comprise walls 56 to enclose a phase change material (which may or may not be the same phase change material as found in chamber 30). Chamber 50 may also comprise an evaporator 52 and condenser 54. Chamber 50 may be configured such that the phase change material may flow from the evaporator 52 to the condenser 54 when the phase change material is a vapor. Conversely, chamber 50 may be configured such that the phase change material may flow from the condenser 54 to the evaporator 52 when the phase change material is a liquid.

In some examples, heat pump 10 may efficiently transfer heat away from a heat source by utilizing voltage sources 60 and/or 70. For example, voltage source 60 may be operably coupled to electrocaloric element 20. Voltage source 60 may apply a voltage (predetermined or otherwise) to electrocaloric element 20. Such voltage may cause the electrocaloric element 20 to transfer heat from the heat source to chamber 30. Similarly, voltage source 70 may be operably coupled to electrocaloric element 40. Voltage source 70 may apply a voltage (predetermined or otherwise) to electrocaloric element 40. Such voltage may cause electrocaloric element 40 to transfer heat from the chamber 30 to chamber 50.

In some examples, the voltage applied to electrocaloric element 20 may only be applied during a first time period. In such examples, the voltage applied to electrocaloric element 40 may only be applied during a second time period. In some examples, the first time period and second time period may not overlap. In other words, in some examples, voltage may not be simultaneously applied to electrocaloric element 20 and electrocaloric element 40.

In some examples, evaporators 32, 52 and/or condensers 34, 54 may be created from sintered materials. In some examples, evaporators 32, 52 may comprise hydrophilic and/or superhydrophilic materials, while condensers 34, 54 may comprise a hybrid hydrophobic/hydrophilic material (such as microfabricated pillars 54A on top of a hydrophilic wick substrate 54B). An effect of such a system may be that evaporators 32, 52 may reach nucleate boiling at a lower temperature than the condensers 24, 54. In some examples, evaporators 32, 52 and/or condensers 34, 54 may be formed using microtexture processes, including, for example, stamping, rolling and/or etching.

In some examples, electrocaloric elements 20, 40 may comprise an electrocaloric film. Such electrocaloric film may be comprised of lead zirconate titanate (PZT), for example. PZT may be a desirable material because it is a well-known piezoelectric, is relatively easy to fabricate, and the creation of PZT may allow for tuning the electrocaloric element 40. In some examples, lead-scandium and/or barium titanate may be utilized. In some examples, the electrocaloric film may be comprised of polymer materials such as ferroelectric poly (vinylidene fluoride-trifluoroethylene) [P(VDF-TrFE)] copolymer and/or relaxor ferroelectric polymer of P(VDF-TrFE-chlorofluoroethylene). In some examples, any pyroelectric, ferroelectric or antiferroelectric material may be utilized. Electrocaloric film thickness may vary depending on particular implementations, and may depend on the speed of the heat pipe and/or the amount of heat being transferred. In some examples, the electrocaloric film may be micrometers thick (for cooling junctions on high performance photodetectors, for example). In some examples, the electrocaloric film may be millimeters thick or even centimeters thick.

Example electrocaloric elements may operate by a change in conformation in the atomic structure that may alter the number and character of energy modes available. This may allow for changes in temperature of the electrocaloric elements without changing the entropy. Therefore, by increasing the temperature (e.g., by applying a voltage) to an electrocaloric element, heat may drain into the surrounding environment. By releasing the voltage (or otherwise reducing the voltage applied to the electrocaloric element) on the electrocaloric element, the electrocaloric element may be cooler than the surrounding environment, but may not move heat continuously. Note that an example embodiment of this heat pump can even pump heat from a cooler surface to a hotter surface if the temperature differential is not greater than the temperature increase of the electrocaloric element.

Figure 2:
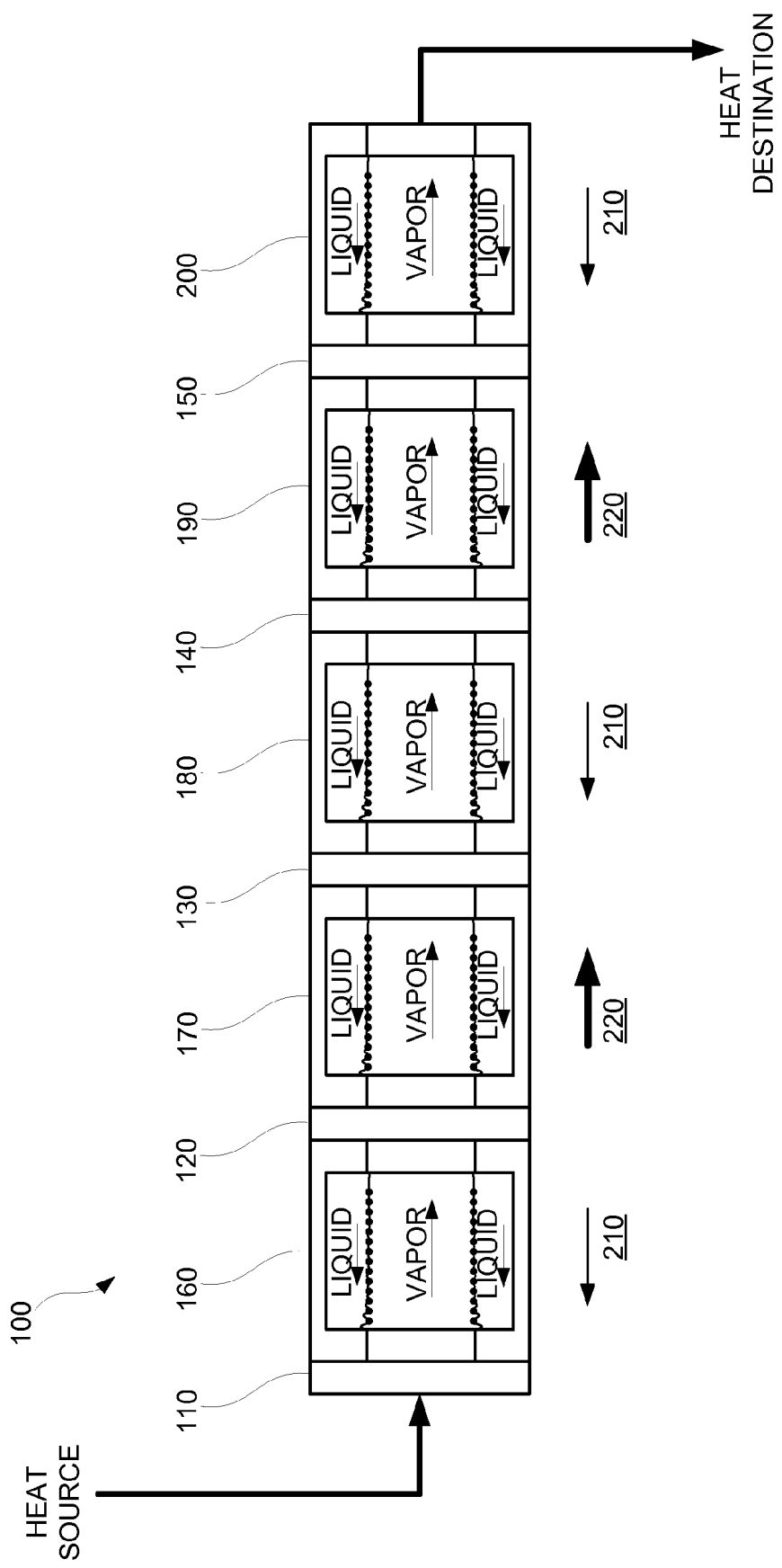
FIG. 2 is a cross-section view illustrating some example systems for transferring heat from a heat source.
Figure 3:
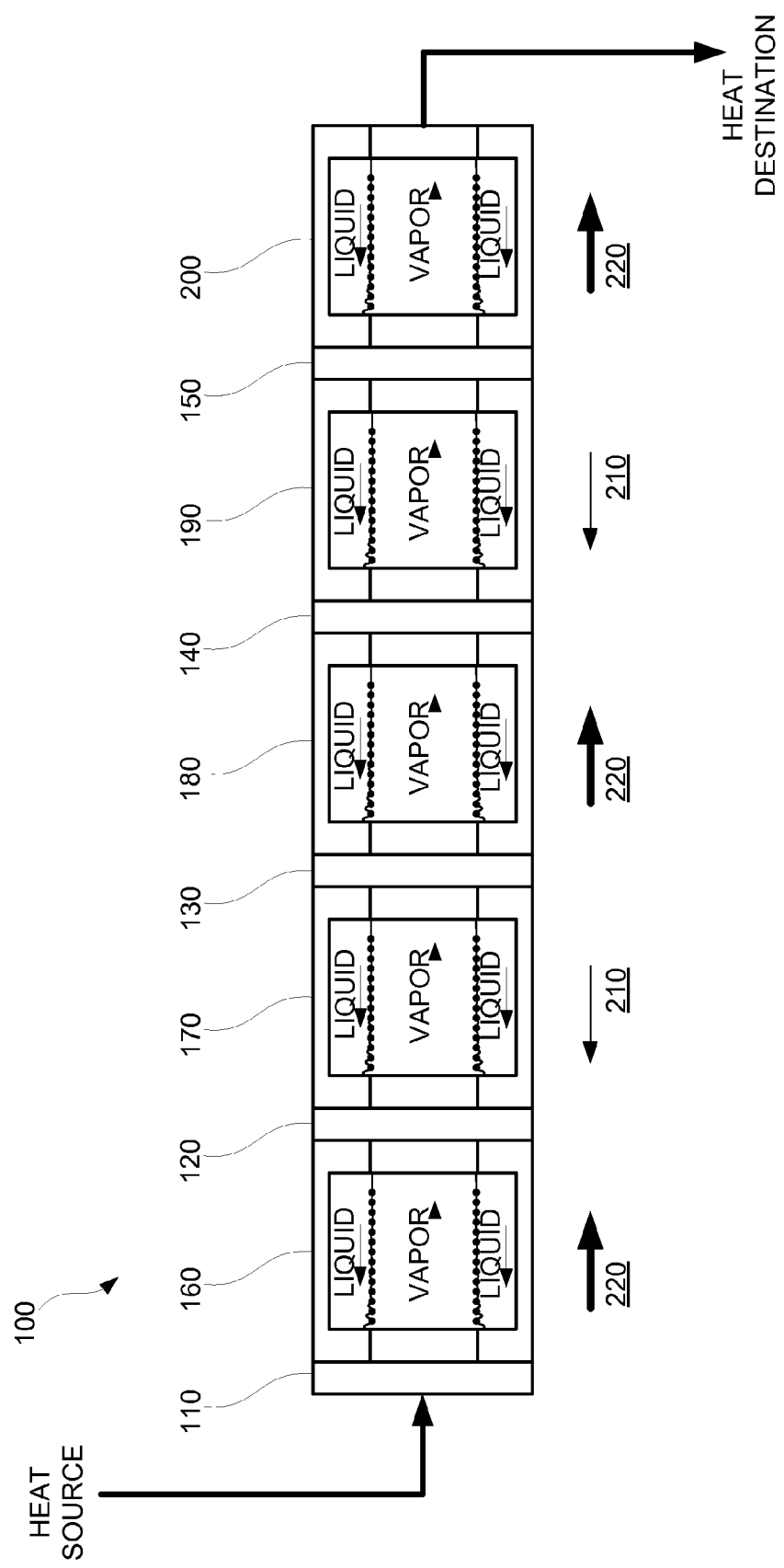
FIG. 3 is a cross-section view illustrating some example systems for transferring heat from a heat source.

FIGS. 2 and 3 are cross-section view illustrating some example systems for transferring heat from a heat source, arranged in accordance with at least some embodiments of the present disclosure. Example heat pump 100 may be comprised of chambers 160, 170, 180, 190, 200 alternately coupled with electrocaloric elements 110, 120, 130, 140, 150, respectively. Each of chambers 160, 170, 180, 190, 200 have evaporator ends, condenser ends and include a phase change material, as previously discussed.

FIG. 2 depicts a first phase of transferring heat away from a heat source. In some examples, electrocaloric elements 120, 140 may have a voltage applied thereto, thus increasing the temperatures of electrocaloric elements 120, 140. Note that, for brevity, one or more voltage sources are not depicted in FIG. 2. Simultaneously, electrocaloric elements 110, 130, 150 may have any voltage applied thereto reduced, thus lowering the temperatures of electrocaloric elements 110, 130, 150. In this manner, only the chambers with their evaporator at relatively higher temperatures (e.g., chambers 170 and 190) may be in a nucleate boiling state. This is depicted in FIG. 2, where the arrows indicate the relative amount of heat flux along each chamber. In this example, lighter arrows 210 may be indicative of a relatively lower heat transfer in the direction of arrows 210. Further, heavier arrows 220 may be indicative of a relatively higher heat transfer in the direction of arrows 220. FIG. 2 generally depicts heat moving away from the heat source and toward a heat destination.

FIG. 3 depicts a second phase of transferring heat away from a heat source. In some examples, electrocaloric elements 110, 130, 150 may have a voltage applied thereto, thus increasing the temperatures of electrocaloric elements 110, 130, 150. Note that, for brevity, one or more voltage sources are not depicted in FIG. 3. Simultaneously, electrocaloric elements 120, 140 may have any voltage applied thereto reduced, thus lowering the temperatures of electrocaloric elements 120, 140. In this manner, only the chambers with their evaporator at relatively higher temperatures (e.g., chambers 160, 180, 200) may be in a nucleate boiling state. This is depicted in FIG. 3, where the arrows indicate the relative amount of heat flux along each chamber. In this example, lighter arrows 210 may be indicative of a relatively lower heat transfer in the direction of arrows 210. Further, heavier arrows 220 may be indicative of a relatively higher heat transfer in the direction of arrows 220. Similar to FIG. 2, FIG. 3 generally depicts heat moving away from the heat source and toward a heat destination.

In some examples, by repeating the first phase (e.g., FIG. 2) and second phase (e.g., FIG. 3) one or more times, heat may efficiently be transferred away from a heat source. While FIGS. 2 and 3 depict a heat pump having five chambers and five electrocaloric elements, longer or shorter arrays of alternating chambers and electrocaloric elements may be utilized.

In some examples, it may be desirable incorporate non-overlapping voltage pulses on the electrocaloric elements. This may restrict (or at least reduce) heat back-propagation by giving a chamber time to drop out of the nucleate boiling region. Desired duty cycle and cycle frequency may change based on an electrocaloric element's thermal capacity, temperature step and/or heat pipe performance. Further, it may be desirable to make a chamber smaller for lower size, weight, and cost by improving heat flux. Finally, it may be desirable to dynamically vary the duty cycle and/or electrocaloric element cycle frequency to adjust heat pumping.

In computer-simulated testing of first and second phases of an example electrocaloric heat pump, a mean heat flux of 12 (scale invariant, but may be watts per second per centimeter squared, for example) between heat blocks (e.g., copper blocks containing a heat source and a heat destination) at identical 30° C. temperatures was observed. Such testing included a thermal resistance through the chambers as five below nucleate boiling and 0.02 during boiling. Such a ratio may be achieved with common commercial heat pipes. A 49% first phase and 49% second phase duty cycle was assumed to be reasonable (for testing purposes only). Further, a cycle speed of 1 kHz was assumed to be reasonable (for testing purposes only) for the assumed heat pipe performance parameters. Simulations were conducted for a 30° C. ambient temperature and an active electrocaloric element temperature boost of 12° C. In some simulations, a heat pipe including an electrocaloric element transferred 5.6 times as much heat as the same heat pipe without an electrocaloric element FIG. 4 is a graphical representation depicting general heat pipe behavior. As depicted, heat transfer properties of a heat pipe and various stages of heat transfer may be based on temperature at the nucleation end (or evaporator end). In some examples, the interior of a heat pipe may include ridges to carry condensed liquid back to the nucleation end, where a special surface may allow the heat to boil the liquid more easily.

FIG. 5 is a graphical representation of example water-based heat pipe behavior. As depicted, heat transfer properties of a heat pipe and various stages of heat transfer may be based on temperature at the nucleation end (or evaporator end). FIG. 5 shows that the operating region of an example water-based heat pipe may have approximately a 50-times (50×) better heat conduction than the pre-boiling region.

Figure 6:
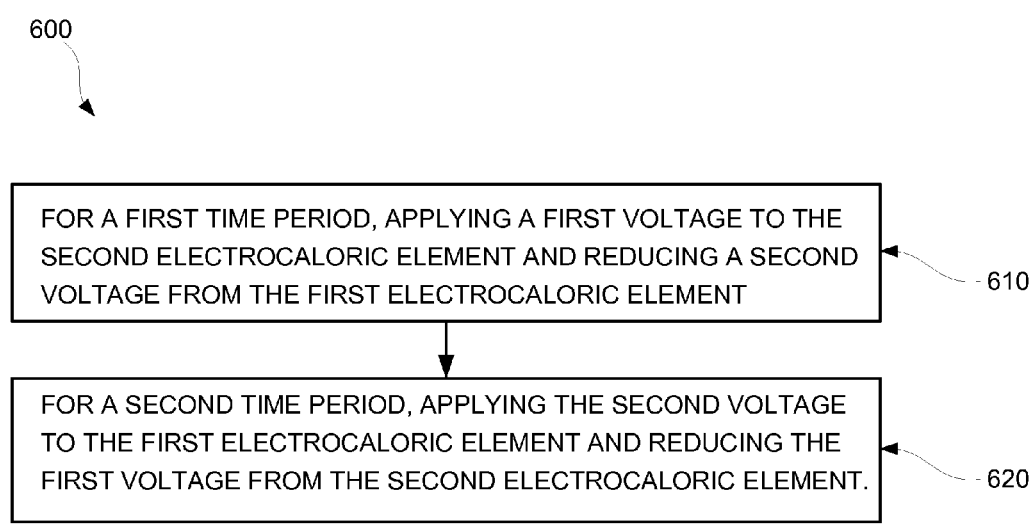
FIG. 6 is a flowchart depicting some example methods for transferring heat from a heat source.

FIG. 6 is a flowchart depicting some example methods 600 of transferring heat from a heat source to a heat destination, in accordance with at least some embodiments of the present disclosure. Example method 600 may include one or more of operations, functions or actions as depicted by blocks 610 and/or 620.

Example method 600 may transfer heat from a heat source to a heat destination by utilizing a first heat pump and a second heat pump that may be serially coupled. The first heat pump may include a first electrocaloric element operably coupled to a first chamber containing a first phase change material. The first electrocaloric element may also include a first evaporator and a first condenser. The second heat pump may include a second electrocaloric element operably coupled to a second chamber containing a second phase change material. The second electrocaloric element may also include a second evaporator and a second condenser.

Processing may begin at block 610, where, for a first time period, a first voltage may be applied to the second electrocaloric element. Further, during the first time period, a second voltage may be removed from (or otherwise reduced) the first electrocaloric element (if a second voltage was applied to the first electrocaloric element). In some embodiments, the first voltage being applied to the second electrocaloric element and the lack of voltage applied to the first electrocaloric element may cause the second evaporator to operate in a nucleate boiling state. In some embodiments, this may cause heat to be transferred from the first heat pump to the second heat pump. Block 610 may be followed by block 620.

At block 620, the second voltage may be applied to the first electrocaloric element. Also at block 620, the first voltage may be removed (or otherwise reduced) from the second electrocaloric element. These may occur during a second time period. In some example, the second time period may be non-overlapping with the first time period.

In some embodiments, the second voltage being applied to the first electrocaloric element and the lack of voltage applied to the second electrocaloric element may cause the first evaporator to operate in a nucleate boiling state. In some embodiments, this may cause heat to be transferred from the heat source to the first heat pump.

Figure 7:
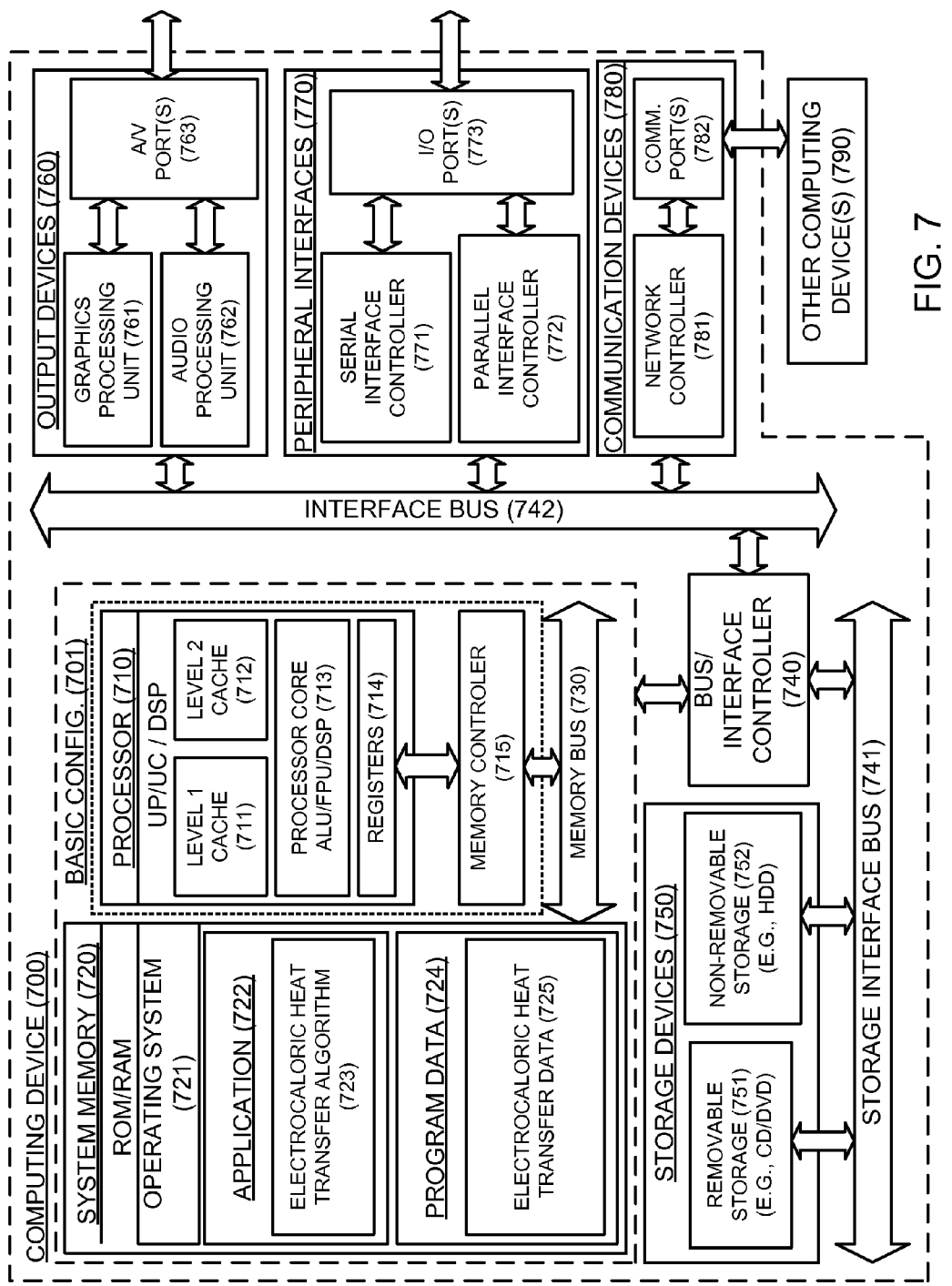
FIG. 7 is a block diagram depicting an example computing device for transferring heat from a heat source, all arranged in accordance with at least some embodiments of the present disclosure.
Figure 3:
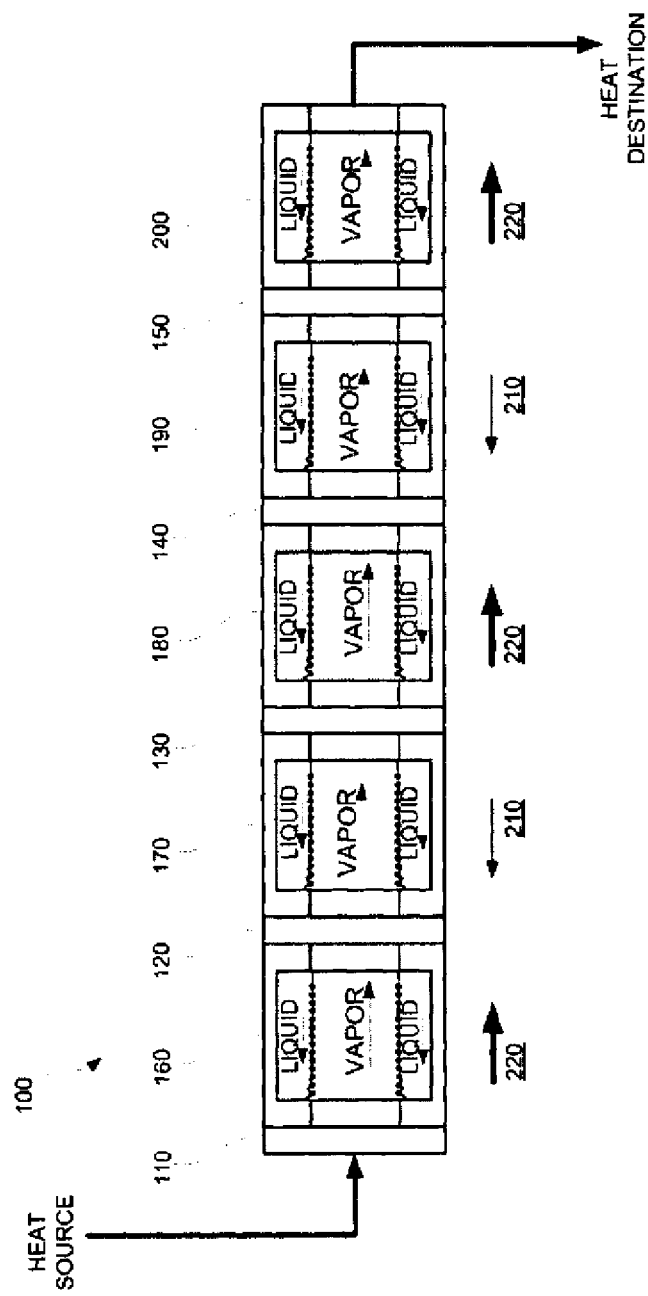
Figure 5:
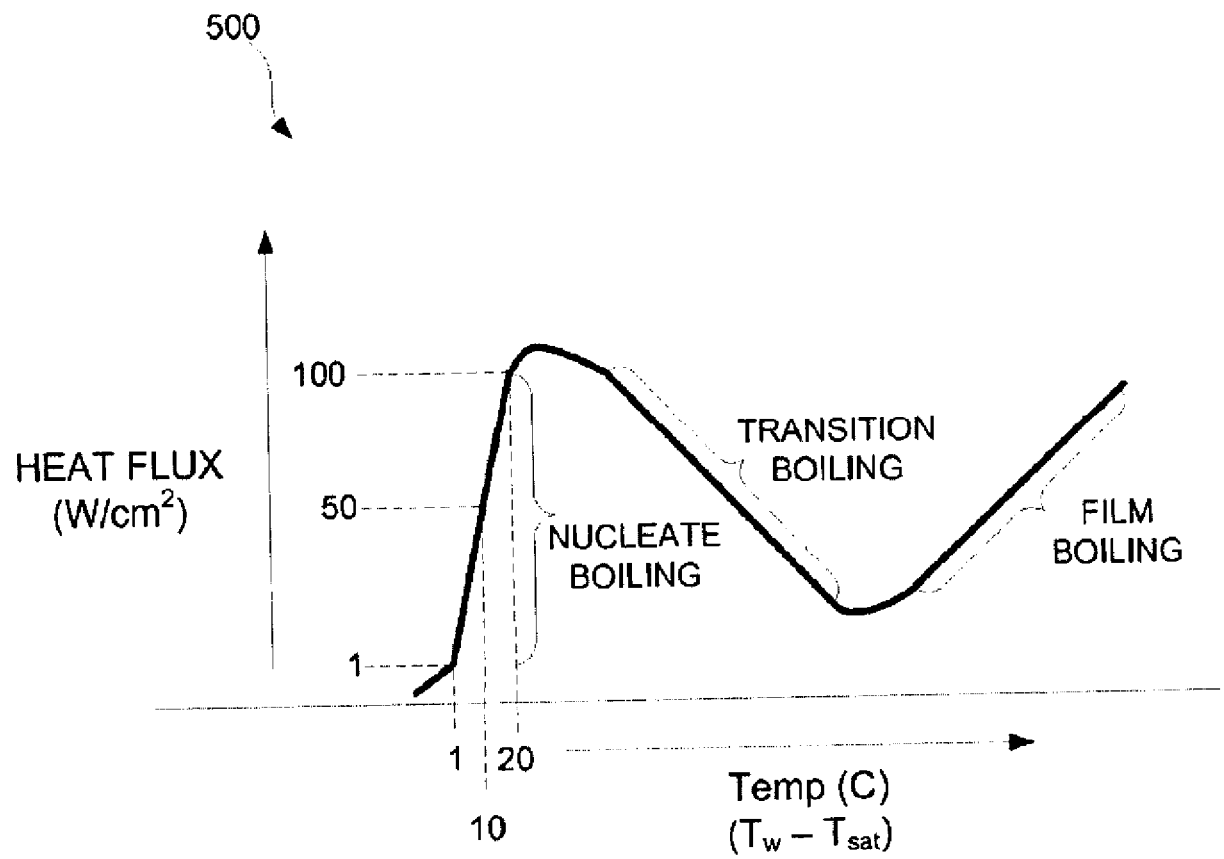
Figure 7:
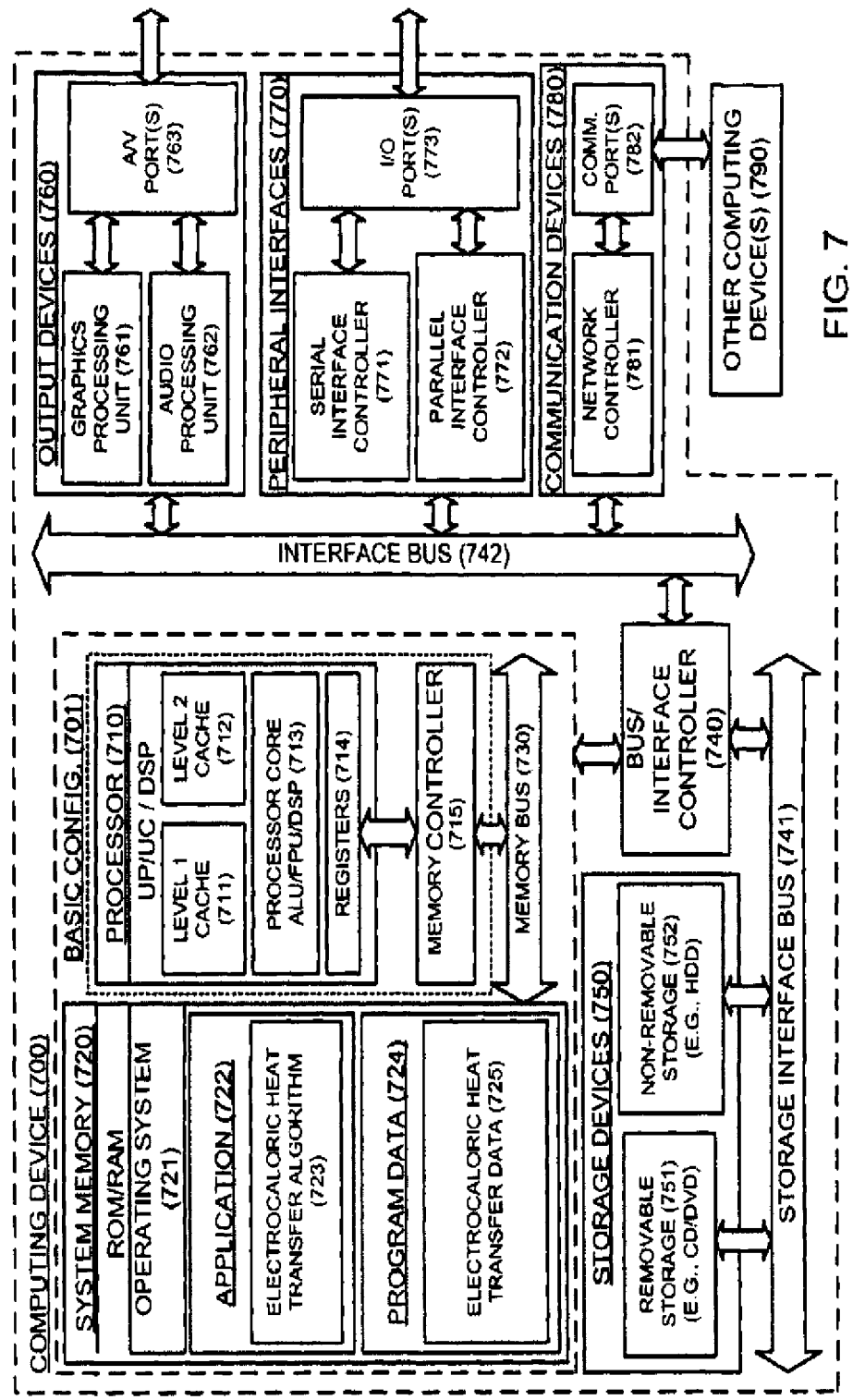

FIG. 7 is a block diagram illustrating an example computing device 700 that may be arranged for electrocaloric heat transfer in accordance with at least some embodiments of the present disclosure. In a very basic configuration 701, computing device 700 typically may include one or more processors 710 and system memory 720. A memory bus 730 may be used for communicating between the processor 710 and the system memory 720.

Depending on the desired configuration, processor 710 may be of any type including but not limited to a microprocessor (µP), a microcontroller (µC), a digital signal processor (DSP), or any combination thereof. Processor 710 may include one more levels of caching, such as a level one cache 711 and a level two cache 712, a processor core 713, and registers 714. An example processor core 713 may include an arithmetic logic unit (ALU), a floating point unit (FPU), a digital signal processing core (DSP Core), or any combination thereof. An example memory controller 715 may also be used with the processor 710, or in some implementations the memory controller 715 may be an internal part of the processor 710.

Depending on the desired configuration, the system memory 720 may be of any type including but not limited to volatile memory (such as RAM), non-volatile memory (such as ROM, flash memory, etc.) or any combination thereof. System memory 720 may include an operating system 721, one or more applications 722, and program data 724. Application 722 may include an electrocaloric heat transfer algorithm 723 that may be arranged to transfer heat from a heat source as described herein. Program Data 724 may include electrocaloric heat transfer data 725 that may be useful for transferring heat from a heat source as will be further described below. In some embodiments, application 722 may be arranged to operate with program data 724 on an operating system 721 such that example implementations of efficient heat transfer may be provided as described herein. This described basic configuration is illustrated in FIG. 7 by those components within dashed line 701.

Computing device 700 may have additional features or functionality, and additional interfaces to facilitate communications between the basic configuration 701 and any required devices and interfaces. For example, a bus/interface controller 740 may be used to facilitate communications between the basic configuration 701 and one or more data storage devices 750 via a storage interface bus 741. The data storage devices 750 may be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of device 700.

Computing device 700 may also include an interface bus 742 for facilitating communication from various interface devices (e.g., output interfaces, peripheral interfaces, and communication interfaces) to the basic configuration 701 via the bus/interface controller 740. Example output devices 760 include a graphics processing unit 761 and an audio processing unit 762, which may be configured to communicate to various external devices such as a display or speakers via one or more A/V ports 763. Example peripheral interfaces 770 include a serial interface controller 771 or a parallel interface controller 772, which may be configured to communicate with external devices such as input devices (e.g., keyboard, mouse, pen, voice input device, touch input device, etc.) or other peripheral devices (e.g., printer, scanner, etc.) via one or more I/O ports 773. An example communication device 780 includes a network controller 781, which may be arranged to facilitate communications with one or more other computing devices 790 over a network communication link via one or more communication ports 782.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

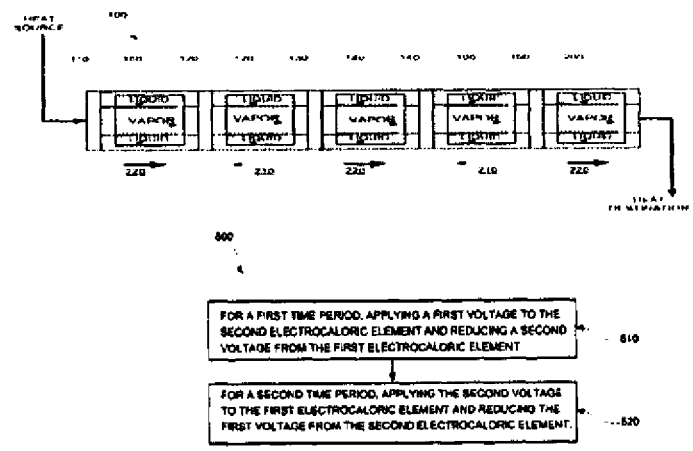

What is claimed is:

1. A heat pump to transfer heat from a heat source to a heat destination, comprising:
    a first electrocaloric element adapted to receive heat from the heat source;
    a first chamber having a first evaporator on a first evaporator end and a first condenser on a first condenser end, the first evaporator being operably coupled to the first electrocaloric element and comprised of at least one of a hydrophilic material or a super-hydrophilic material, and the first condenser comprising a hybrid hydrophobic/hydrophilic material;
    a first phase change material enclosed in the first chamber, the first phase change material adapted to be at least one of a first liquid state or a first vapor state, the first phase change material adapted to flow from the first evaporator to the first condenser when in the first vapor state, and further adapted to flow from the first condenser to the first evaporator when in the first liquid state;
    a second electrocaloric element operably coupled to the first condenser;
    a second chamber having a second evaporator on a second evaporator end and a second condenser on a second condenser end, the second evaporator comprised of at least one of a hydrophilic material or a super-hydrophilic material and being operably coupled to the second electrocaloric element, the second condenser end being adapted to transfer heat to the heat destination, and the second condenser comprising the hybrid hydrophobic/hydrophilic material;
    and
    a second phase change material enclosed in the second chamber, the second phase change material adapted to be at least one of a second liquid state or a second vapor state, the second phase change material adapted to flow from the second evaporator to the second condenser when in the second vapor state, and further adapted to flow from the second condenser to the second evaporator when in the second liquid state.

2. The heat pump of claim 1, wherein the first phase change material comprises water, the first liquid state comprises liquid water and the first vapor state comprises water vapor.

3. The heat pump of claim 1, wherein the second phase change material comprises water, the second liquid state comprises liquid water and the second vapor state comprises water vapor.

4. The heat pump of claim 1, wherein the hybrid hydrophobic/hydrophilic material is comprised of micro-fabricated pillars on a surface of a hydrophilic wick substrate, wherein at least one of the first evaporator or second evaporator is configured to reach nucleate boiling at a lower temperature than one of the first condenser or the second condenser.

5. The heat pump of claim 1, wherein the first electrocaloric element comprises a first electrocaloric film.

6. The heat pump of claim 5, wherein the first electrocaloric film is comprised of at least one of lead zirconate titanate, lead-scandium, barium titanate, a polymer, a pyroelectric material, a ferroelectric material, or an antiferroelectric material.

7. The heat pump of claim 1, wherein the second electrocaloric element comprises a second electrocaloric film.

8. The heat pump of claim 7, wherein the second electrocaloric film is comprised of at least one of lead zirconate titanate, lead-scandium, barium titanate, a polymer, a pyroelectric material, a ferroelectric material, or an antiferroelectric material.

9. The heat pump of claim 1, further comprising:
    a first voltage source operably coupled to the first electrocaloric element, the first voltage source adapted to apply a first voltage to the first electrocaloric element, wherein the first voltage may cause the first electrocaloric element to transfer heat from the heat source to the first chamber; and
    a second voltage source operably coupled to the second electrocaloric element, the second voltage source adapted to apply a second voltage to the second electrocaloric element, wherein the second voltage may cause the second electrocaloric element to transfer heat from the first chamber to the second chamber.

10. The heat pump of claim 9, wherein the first voltage is applied to the first electrocaloric element at a first time period and the second voltage is applied to the second electrocaloric element at a second time period.

11. The heat pump of claim 10, wherein the first time period and the second time period are non-overlapping time periods.

12. A heat pump to transfer heat from a heat source to a heat destination, comprising:
    an electrocaloric element adapted to receive heat from the heat source;
    a chamber having an evaporator comprised of at least one of a hydrophilic material or a super-hydrophilic material on a first end and a condenser comprised of a hybrid hydrophobic/hydrophilic material on a second end, the evaporator being operably coupled to the electrocaloric element, the second end being adapted to transfer heat to the heat destination; and
    a phase change material enclosed in the chamber, the phase change material adapted to be at least one of a liquid state or a vapor state, the phase change material adapted to flow from the evaporator to the condenser when in the vapor state and the phase change material adapted to flow from the condenser to the evaporator when in the liquid state,
    wherein the hybrid hydrophobic/hydrophilic material is comprised of micro-fabricated pillars on a surface of a hydrophilic wick substrate that enables the evaporator to reach nucleate boiling at a lower temperature than the condenser.

13. The heat pump of claim 12, further comprising:
    a voltage source operably coupled to the electrocaloric element, the voltage source adapted to apply a voltage to the electrocaloric element to cause the electrocaloric element to transfer heat from the heat source to the chamber.

14. A method to transfer heat from a heat source to a heat destination via a first heat pump and a second heat pump serially coupled, the first heat pump comprising a first electrocaloric element operably coupled to a first chamber at least partially containing a first phase change material and having a first evaporator and a first condenser, and the second heat pump comprising a second electrocaloric element operably coupled to a second chamber at least partially containing a second phase change material and having a second evaporator and a second condenser, the method comprising:

providing the first and second evaporators with one of a hydrophilic material or a super hydrophilic material, and the first and second condensers with a hybrid hydrophobic/hydrophilic material;

for a first time period, applying a first voltage to the second electrocaloric element and reducing a second voltage from the first electrocaloric element to cause the second evaporator to reach nucleate boiling at a lower temperature than the second condenser; and for a second time period, applying the second voltage to the first electrocaloric element and reducing the first voltage from the second electrocaloric element to cause the first evaporator to reach nucleate boiling at a lower temperature than the first condenser.

15. The method of claim 14, wherein the first time period and the second time period comprise non-overlapping time periods.

16. The method of claim 14, wherein the hybrid hydrophobic/hydrophilic material is comprised of micro-fabricated pillars on a surface of a hydrophilic wick substrate.

17. The method of claim 14, wherein the applying the first voltage to the second electrocaloric element and reducing the second voltage from the first electrocaloric element causes the second evaporator to operate in a nucleate boiling state.

18. The method of claim 17, wherein heat is transferred from the first heat pump to the second heat pump in response to operation of the second evaporator in the nucleate boiling state.

19. The method of claim 14, wherein the applying the second voltage to the first electrocaloric element and reducing the first voltage from the second electrocaloric element causes the first evaporator to operate in a nucleate boiling state.

20. The method of claim 19, wherein heat is transferred from the heat source to the first chamber in response to operation of the first evaporator in the nucleate boiling state.

\* \* \* \* \*

UNITED STATES PATENT AND TRADEMARK OFFICE
CERTIFICATE OF CORRECTION

PATENT NO. : 8,769,967 B2
APPLICATION NO. : 12/999182
DATED : July 8, 2014
INVENTOR(S) : Kruglick It is certified that error appears in the above-identified patent and that said Letters Patent is hereby corrected as shown below:

Delete the title page and substitute therefor with the attached title page consisting of the corrected illustrative figure.

On Page 2, in Item (56), under "OTHER PUBLICATIONS", in Column 2, Line 47, delete "R.." and insert -- R., --, therefor.

On Page 2, in Item (56), under "OTHER PUBLICATIONS", in Column 2, Line 53, delete "W,N." and insert -- W. N. --, therefor.

In the Drawings

Delete Drawing Sheets 3, 5 and 7 and substitute therefor with the attached Drawing Sheets 3, 5 and 7. FIGS. 3, 5, and 7 have been corrected.

In the Specification

In Column 2, Lines 11-12, delete "a antiferroelectric" and insert -- an antiferroelectric --, therefor.

In Column 2, Line 18, delete "a antiferroelectric" and insert -- an antiferroelectric --, therefor.

In Column 5, Line 2, delete "implemetations" and insert -- implementations. --, therefor.

In Column 7, Line 31, delete "element" and insert -- element. --, therefor.

Signed and Sealed this
Twentieth Day of January, 2015

Michelle K. Lee
*Deputy Director of the United States Patent and Trademark Office*

(12) United States Patent
Kruglick

(10) Patent No.: US 8,769,967 B2
(45) Date of Patent: Jul. 8, 2014

(54) ELECTROCALORIC HEAT TRANSFER

(75) Inventor: Ezekiel Kruglick, Poway, CA (US)

(73) Assignee: Empire Technology Development LLC, Wilmington, DE (US)

(*) Notice: Subject to any disclaimer, the term of this patent is extended or adjusted under 35 U.S.C. 154(b) by 639 days.

(21) Appl. No.: 12/999,182

(22) PCT Filed: Sep. 3, 2010

(86) PCT No.: PCT/US2010/047887
§ 371 (c)(1),
(2), (4) Date: Dec. 15, 2010

(87) PCT Pub. No.: WO2012/030351
PCT Pub. Date: Mar. 8, 2012

(65) Prior Publication Data
US 2012/0055174 A1 Mar. 8, 2012

(51) Int. Cl.
*F25B 21/00* (2006.01)
*H01F 1/12* (2006.01)

(52) U.S. Cl.
CPC ............ *F25B 21/00* (2013.01); *Y02B 30/66* (2013.01); *F25B 2321/001* (2013.01)
USPC ............................................. 62/3.3

(58) Field of Classification Search
CPC .......... Y02B 30/66; H01F 1/15; H01F 1/017; H01F 1/12
USPC ............................................. 62/3.1
See application file for complete search history.

(56) References Cited

U.S. PATENT DOCUMENTS

| | | | |
|---|---|---|---|
| 2,978,875 A | 4/1961 | Lackey et al. |
| 4,673,030 A | 6/1987 | Basiulis |
| 4,757,688 A | 7/1988 | Basiulis et al. |
| 5,229,566 A | 7/1993 | Alexandres |
| 5,515,238 A | 5/1996 | Fritz et al. |
| 6,556,752 B2 | 4/2003 | Fang et al. |
| 6,588,215 B1 | 7/2003 | Ghoshal |
| 6,711,904 B1 | 3/2004 | Law et al. |
| 6,877,325 B1 | 4/2005 | Lawless |
| 7,293,416 B2 | 11/2007 | Ghoshal |
| 7,305,839 B2 | 12/2007 | Weaver, Jr. |
| 7,421,845 B2 | 9/2008 | Bell |

(Continued)

FOREIGN PATENT DOCUMENTS

| | | |
|---|---|---|
| GB | 2420662 A | 5/2006 |
| JP | H11177151 A | 7/1999 |
| WO | 2006056809 A1 | 6/2006 |
| WO | 2009126344 A2 | 10/2009 |

OTHER PUBLICATIONS

McNeil, D.A., "Pressure Drop and Heat Transfer Distributions Around a Bundle of Plasma-Treated Tubes Condensing Dropwise," Department of Mechanical and Chemical Engineering, Heriot-Watt University, Dec. 1999.

(Continued)

*Primary Examiner* — Ljiljana Ciric
*Assistant Examiner* — Alexis Cox
(74) *Attorney, Agent, or Firm* — Hope Baldauff, LLC

(57) ABSTRACT

A heat pump, including first and second chambers enclosing phase change material, each chamber having an evaporator end with hydrophilic material and a condenser end with a hybrid hydrophobic/hydrophilic material. Each chamber is also operably connected to a respective electrocaloric element.

20 Claims, 7 Drawing Sheets